3,157,948
SHEET CUTTING MACHINE
Harry M. Schwartz, 5310 Lynview Ave.,
Baltimore 15, Md.
Filed June 6, 1963, Ser. No. 286,053
3 Claims. (Cl. 30—273)

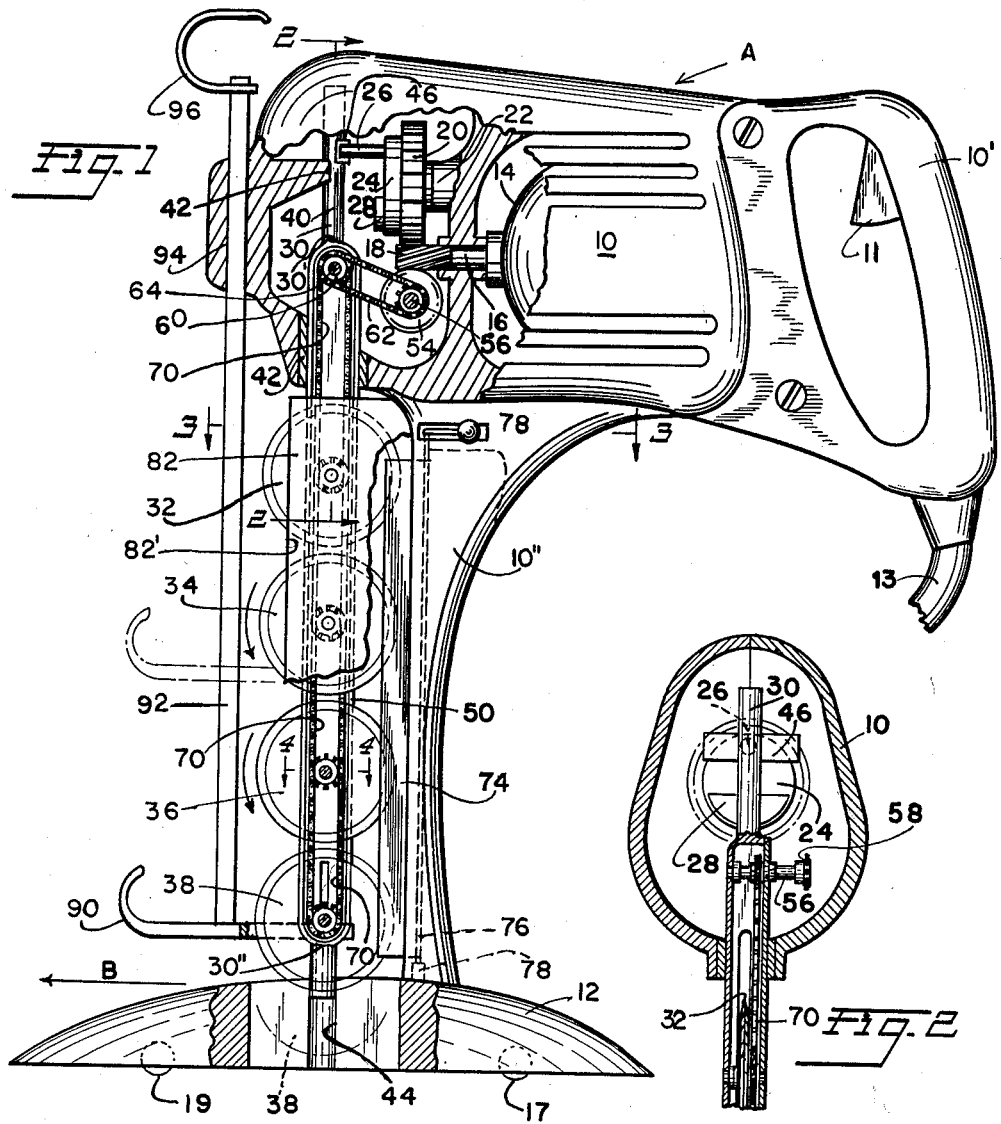

The present invention relates to an improvement in a sheet cutting machine particularly to the type of fabric cutting machine used in garment shops for cutting multiple layers of cloth or webbing. The machine is of such a design that it is not only desirable for cutting garment materials, but may be used in many cutting operations, including pliable plastics, sheet and similar materials.

The primary object of the invention is to provide a cutting machine of this type that has both the advantage of a reciprocating straight blade and the single rotary wheel type blade.

Another object of the invention is to provide a machine of this type wherein the machine combines both the reciprocating action and the rotary action for the blade.

A further object of the invention is to provide a unique sharpening arrangement for the cutting blades or elements.

Still another object of the invention is to provide a cutting machine with a rotary cutting blade wherein it is possible to cut the material in a vertical line throughout the height of its cutting operation.

It has always been practically impossible to get into corners or to cut to a vertical line with a single rotary blade, which is at present a preferred cutting machine, and further more, the single rotary blade is limited in the thickness of the pile of fabrics it is to cut.

While several objects of the invention have been pointed out other objects will become more apparent as the nature of the invention is more fully disclosed which consists of unique construction, combination and arrangement of its several parts as illustrated and described in specifications to follow.

Referring to the illustrations:

FIGURE 1 is a vertical side view of the machine partly in elevation and partly in section showing the various elements and the manner in which they are operated.

FIGURE 2 is a sectional view taken on line 2—2 of FIGURE 1.

FIGURE 3 is a sectional view taken along line 3—3 of FIGURE 1.

FIGURE 4 is a sectional view taken along line 4—4 of FIGURE 1.

The machine in general is designated by the letter A having a housing 10 for an electric motor, a handle portion 10' and a supporting portion 10" having its upper end connected to the under side of the housing and its lower end connected with a base 12.

The machine is operated by an electric motor 14. The motor is provided with a shaft 16 and a small gear 18 carried by the shaft 16. The gear 18 is adapted to mesh with the gear 20, which in turn is rotatably supported on the housing 10 by a suitable support such as shown at 22. Secured to the gear 20 and adapted to rotate therewith is a member 24. The member 24 is provided at one end of its diameter with a pin 26 and at the opposite end of the diameter with a counter weight 28. When the gear 20 is operated by the motor 14 the pin moves in a prescribed circle and is so eccentrically positioned from the axes of the gear 20 as to give the calculated reciprocating motion to the cutting assembly which consists generally of the reciprocable bar 30 and the rotatable cutter blades 32, 34, 36 and 38.

The bar 30 is bearinged at both its upper and lower ends. The upper end of the bar is carried in bearings 40 and 42 and the lower end is carried in bearing 44. The upper end of the bar 30 is provided with a rigid channeled cross member 46. This cross member extends an equal distance on each side of the vertical axes of the bar and is of such length as to accommodate the lateral movement of the pin which is adapted to ride within the channel with a slidable fit, which will reciprocate the bar 30 as the gear 20 and the attached member 24 and pin are rotated.

Extending along the bar 30 between the under surface of the housing 10 and the base 12 are the rotatable cutters 32 to 38. These cutters are closely spaced and are rotated in the direction of the arrow, shown in FIGURE 1.

To accommodate the rotatable cutters the bar 30 takes on a different form between the points 30' and 30". This section of the bar takes the form of an elongated hollow channel member 50 and a cover 52. For rotating the cutter blades or elements, there is provided a gear 54 rotatably mounted on a shaft 56, which is rotatable by the gear 18. Secured to the shaft 56 is sprocket 58. Adjacent the upper end of the portion 50 of the bar 30 is a sprocket 60 mounted in line with the sprocket 58 and is adapted to be connected therewith by a link chain 62. The sprocket 60 is carried on a shaft 64.

Each of the rotatable cutters is rotatable and individually mounted on the bar portion 50 upon a hub member 66, as best shown in FIGURE 4, at 66. Secured to the hub 66 and adapted to rotate with the cutter element 36 is a sprocket 68. The hub is rotatably supported upon a shaft 67, which is held in the aperture 69 in the member 50 and aperture 71 in the cover 52. All of the cutter elements are mounted in the same manner and therefore there seems to be no necessity in describing the holding and operating means of each of the cutting elements.

Extending from and around the sprocket 60 to the sprocket of the bottom cutting element 38 is a small link chain 70. This chain extends down within the casing 50 and engages the sprockets 68 of each of the cutting elements, rotating them in the same direction.

It will be seen by this construction that the rotary blades will be rotated in the direction of the arrow shown adjacent cutters 34 and 36, and at the same time they will be moved up and down in a vertical plane to the extent that the center of each of the rotary cutters will move between the place occupied by the axis of the adjacent cutter element. In this way, the normal space between the cutter blades is also cut as the blades are moved up and down. It will also be noted that the lower cutter 38 moves into the base to a point along a line of its lateral diameter.

The rotary cutters are sharpened by a unique sharpener. This sharpening operation is carried out from two strips 72 and 74 secured to a member 76. The member 76 is journalled to pivot about its rear vertical axis as shown by the bearing 78 adjacent its bottom and a bearing adjacent its upper end (not shown). The strips 72 and 74 are provided with abrasive faces 72' and 74' adjacent the edges of the cutter blades 32 to 38. These strips 72 and 74 are normally resiliently held out of contact with the blades. When it is desired to sharpen the blades, the strips 72 and 74 are alternately swung in contact with the edges of the rotating blades by the lever 78. By this arrangement, it will be seen that the blades may be sharpened at any time, even when the machine is performing its cutting function. While a specific arrangement has been provided for sharpening the rotary cutters, any other suitable means may be used.

The rotary blades are covered by side plates 80 and 82 to a line 82' adjacent the forward portion of the blade. The blade is adapted to extend a short distance in front of the side shields and between the front edges of the shields which converge to form a narrow slot as shown at 86 in FIGURE 3. The shield is fixed to the portion 10" of the housing and is only partly shown in FIGURE 1; however, the shield extends through the entire distance of the support portion 10″, that is, from the base 12 to a point adjacent the lower side of the housing 10.

To keep the layers of material in contact with each other there is provided an adjustable shoe 90 which is supported upon a rod 92 which is in turn slidably supported in a bearing 94. The foot may be adjusted by moving the rod up and down by the handle 96. There is provided means (not shown) for holding the rod in the adjusted vertical position.

In constructing the machine the reciprocating movement should be relatively slow, preferably around one hundred strokes per minute and meanwhile the rotary cutters are rotated at a relatively high speed similar to that now maintained by the single rotary cutters.

The machine is adapted to be moved on a cutting table (not shown) on rollers 17 and 19 and the cutting direction of the machine is indicated by the arrow B shown in FIGURE 1.

While the machine has been shown in a specific form and its parts in a specific arrangement, it is not intended as a limitation as various ways may be used to rotate the cutter blades and for reciprocating the supporting bar on which the cutters are carried in a vertical plane without departing from the general principles set forth in the invention, the scope of which is best defined in the appending claims.

I claim:
1. A sheet cutting machine comprising in combination:
   (a) a base having a convexed upper surface;
   (b) a narrow vertical supporting standard having one end fixed to the base and extending upwardly therefrom;
   (c) a motor housing fixed to the upper end of the standard having an electric motor including a rotatable shaft supported within the housing and extending toward the front of the machine;
   (d) a vertical reciprocal bar reciprocating in front of and in a plane with the standard having means for maintaining the bar in a vertical alignment with the standard;
   (e) a vertical positioned bearing positioned adjacent the front of the motor housing supporting the upper end of the bar and a vertical positioned bearing positioned adjacent the lower end of the vertical reciprocating bar and in front of the standard supporting the lower end of the bar during its reciprocating motion;
   (f) a plurality of circular cutting elements closely and equally spaced in a vertical plane and rotatably supported upon and along the vertical bar and reciprocating therewith and having their cutting edge on the opposite side of their axis from the supporting standard, and the cutters being rotatably secured to the bar in the same vertical plane and in a vertical plane parallel and adjacent that of the reciprocating bar;
   (g) means cooperating between the rotatable motor shaft and the reciprocal bar for reciprocating the bar through a distance substantially equal to one-half the diameter of the circular cutter elements;
   (h) means operatable by the rotatable motor shaft and extending along the bar for rotating the rotary cutter elements;
   (i) the base having a narrow slot in the same plane with the rotating cutter elements and of such depth as to receive substantially one-half the diameter of the lower rotor cutter;
   (j) the bar reciprocating means lifting the lower rotor cutter to a highest point where the outer circumference thereof is slightly below the plane of the top surface of the base;
   (k) a driving means for said rotary cutters extending vertically along and adjacent the bar and means at the upper end of the reciprocating bar for operating the cutter driving means at a substantially constant speed, a single fixed drive engaging means carried by each of the cutter elements for engaging the vertical driving means for rotating the cutters;
whereby the front edge of the rotary cutters is always in contact with the material from the upper surface of the base to the upward position of the upper rotary cutter and at a constan speed.

2. A sheet cutting machine as claimed in claim 1 wherein the circular cutter element supporting bar is provided with an open side channel having parallel walls perpendicular to the plane of the cutter elements, the open side of the channel extended toward the side surfaces of the cutters, a sprocket fixed to each of the cutters adjacent the hubs thereof, a drive sprocket rotatably mounted at and upon the upper end of the reciprocating bar, a link chain extending over the drive sprocket and along the inner side wall and between the parallel side sections of the channel walls engaging the sprockets carried by the cutter elements operating the same at a constant speed.

3. A sheet cutting machine as claimed in claim 1 wherein the rotary cutters are enclosed within a symmetrical cross-sectional vertical housing extending outwardly and along both sides of the cutter elements and carried by the support having a slot along its edge opposite the support covering the cutters from their rear to a line forward of their rotating axis and adjacent their forward cutting edge.

References Cited by the Examiner
UNITED STATES PATENTS

| | | | |
|---|---|---|---|
| 1,282,735 | 10/18 | Blumenthal | 30—138 X |
| 1,514,696 | 11/24 | Gury | 30—264 X |
| 1,983,775 | 12/34 | Quinn et al. | 74—22 |

WILLIAM FELDMAN, *Primary Examiner.*
MILTON MEHR, *Examiner.*